United States Patent [19]

Clausi et al.

[11] Patent Number: 5,135,764
[45] Date of Patent: Aug. 4, 1992

[54] COFFEE BAG BREWING BY MICROWAVE

[75] Inventors: Adolph S. Clausi, Cos Cob, Conn.; Thomas M. Ott, Westwood, N.J.

[73] Assignee: Kraft General Foods, Inc., Northfield, Ill.

[21] Appl. No.: 73,362

[22] Filed: Jul. 6, 1987

Related U.S. Application Data

[63] Continuation of Ser. No. 655,195, Sep. 27, 1989, abandoned.

[51] Int. Cl.⁵ .............................................. A23L 1/025
[52] U.S. Cl. ...................................... 426/241; 426/77; 426/78
[58] Field of Search ........................... 426/77, 78, 241

[56] References Cited

U.S. PATENT DOCUMENTS

| | | |
|---|---|---|
| 2,022,467 | 11/1935 | Heyman. |
| 2,110,732 | 3/1938 | Kane. |
| 2,137,243 | 11/1938 | Heyman. |
| 2,146,753 | 2/1939 | Luckhaupt. |
| 2,157,656 | 5/1939 | Doble. |
| 2,162,272 | 6/1939 | Patterson. |
| 2,698,082 | 12/1954 | Maloney. |
| 2,786,761 | 3/1957 | Weisman. |
| 2,805,164 | 9/1957 | Doppler. |
| 2,824,002 | 2/1958 | Hiscock. |
| 3,199,437 | 8/1965 | Nelsen. |
| 3,347,151 | 10/1967 | Ronalds. |
| 3,640,727 | 2/1972 | Heusinkueld ........................... 426/77 |
| 3,846,569 | 11/1974 | Kaplan. |
| 3,879,565 | 4/1975 | Ernstman et al. ................. 426/78 X |
| 4,104,957 | 8/1978 | Freedman et al. ...................... 99/283 |
| 4,204,004 | 5/1980 | Farr et al.. |
| 4,229,481 | 10/1980 | Fornari ................................... 426/77 |
| 4,386,109 | 5/1983 | Bowen et al. ......................... 426/241 |
| 4,410,550 | 10/1983 | Gaskill. |
| 4,443,481 | 4/1984 | Donarumma et al.. |
| 4,465,697 | 8/1984 | Briee et al. ......................... 426/77 X |

OTHER PUBLICATIONS

Bourque, Country Kettle Microwave Cookbook, 1978, publ by the Author: Ottawa, KS., pp. 133, 153, 155.
Copson, Microwave Heating, 1962, Avi: Westport, Conn., p. 393.

Primary Examiner—Joseph Golian
Attorney, Agent, or Firm—Thomas A. Marcoux; Linn I. Grim; Thomas R. Savoie

[57] ABSTRACT

Roasted and ground coffee is packaged in an infusion coffee bag for use in brewing a cup of coffee in a microwave oven. The brewing bag is placed in a container of water and the container is heated in a microwave oven yielding a high quality coffee beverage in a rapid period of time.

10 Claims, No Drawings

COFFEE BAG BREWING BY MICROWAVE

This application is a continuation of application Ser. No. 655,195, filed Sep. 27, 1984 and now abandoned.

BACKGROUND OF THE INVENTION

1. Technical Field

This invention relates to a method for preparing brewed coffee utilizing an infusion coffee bag containing roasted and ground coffee. The infusion coffee bag is immersed in water and microwave heated to produce a high quality coffee brew in a short period of time.

2. Description of the Prior Art

It has long been desired to provide the consumer with a coffee bag product which might be used in the same fashion as the conventional and popular tea bag and which would produce a high quality coffee beverage. Previous attempts of merely placing roast and ground coffee in lieu of tea in standard filter paper infusion bags have not proven successful. One of the difficulties encountered is that the time required to produce a flavorful cup of coffee beverage is considerably longer than that for tea.

One method of decreasing the time to produce a coffee beverage is to increase the porosity of the infusion coffee bag. The increase in porosity, however, also permits increased amounts of coffee grounds to escape thereby producing accumulations of sediment in the cup.

Another method for decreasing the time to brew a coffee beverage is disclosed in U.S. Pat. No. 3,879,565 to Einstman et al. In this patent a coffee brewing bag similar to that employed with ordinary tea is packaged with roasted and ground coffee. The roasted and ground coffee is combined with a defoaming agent to disperse foam generated within the bag to improve the rate of extraction of the coffee material. The coffee bag is placed into a cup and hot boiling water is added. While the rate to produce a coffee beverage is improved the expense is increased by adding the defoaming agent.

Another method of producing a coffee brew is disclosed in U.S. Pat. No. 4,104,957 to Freedman et al. In this patent a coffee brewing appliance is described which is subjected to microwave heating. This invention, however, does not lend itself to the convenience of quickly preparing a single serving of coffee brew. The patent further mentions making coffee by boiling water in a microwave oven and then adding instant coffee but indicates this makes inferior coffee.

Accordingly, the need exits for a method of producing a coffee beverage in a simplified and inexpensive manner from a coffee infusion bag which yields a high quality coffee beverage in a short period of time.

SUMMARY OF THE INVENTION

This invention pertains to a method for preparing a coffee brew by immersing an infusion coffee bag containing roasted and ground coffee into a container of water and then microwave heating the water containing the infusion coffee bag to a temperature effective to produce a coffee brew.

It has been found that when this invention is employed a high quality coffee beverage is produced in a short period of time and in a simplified and inexpensive manner.

DETAILED DESCRIPTION OF THE INVENTION

According to the present invention, water having a temperature from about 50° F. to about 150° F. and preferably from about 60° F. to about 75° F., is first added to a container such as a cup or a pot. The water is suitably cold tap water or water at room temperature, however, hot tap water or preheated water below 150° F. may be employed. The water is added in an amount of at least one coffee serving size which is at least 4 oz. and preferably at least 6 oz. More than one serving size amounts of water may be added to the container. For each serving size amount of water in the container is immersed an infusion coffee bag comprised of roasted and ground coffee packaged in a filtered paper infusion bag. Suitably the roasted and ground coffee has an average particle size from about 400 mesh to about 1100 mesh. The bag material may be comprised of a thin porous filter paper preferably coated on at least a portion of one side with a thermoplastic material which will become adhesive upon being subject to heat and pressure, thus enabling formation of the bag by a heat sealing operation. Suitable tea bag material will have a porosity of from about 300 cubic feet per minute to about 650 cubic feet per minute of air per square foot at 0.5 inches of water pressure. Conventional tea bag material has proven satisfactory for use in this invention. It is also possible to use for the infusion coffee bag of this invention material which has a porosity somewhat greater than conventional tea bag material. Care should be taken, however, to prevent excess amounts of insoluble coffee material from passing through the bag material. Screening or pelletizing the roasted and ground may be employed to reduce the amount of fine coffee material present within the infusion bag.

The roasted and ground coffee material used in this invention may be any single variety of coffee but it is usually a blend of different varieties. The blend may be formulated either before or after roasting or grinding. The coffee may be decaffeinated or undecaffeinated. The amount of coffee in the bag must be suitable for producing a serving size of coffee which is generally from about 5 gms to about 15 gms.

The container with water and the immersed infusion coffee bag is then placed into a microwave heater. Most microwave ovens employed for the ordinary household use operate at 2,450 megahertz and at a wavelength of 12.2 cm. Other frequencies may be used for microwave cooking, for example, 915 megahertz with a wavelength of 33 cm is also commonly employed. The amount of power employed for household cooking may be as little as 400 watts and as high as 2,000 watts for some catering ovens. In general, however, most domestic microwave ovens are in the range of 600 to 1,000 watts at the frequency of 2,450 megahertz.

After the container of water with the immersed infusion coffee bag is placed into the microwave oven it is heated to a temperature effective to produce a coffee brew. Suitably this temperature is in the range from about 160° F. to about 210° F. and preferably is in the range from about 170° F. to about 200° F. When a single serving cup of coffee is prepared, the heating time is generally less than 2 minutes and often less than 1½ minutes. When multiple servings are prepared, a somewhat longer time is needed depending on the amount of servings.

After the microwave has been completed, it is often necessary to remove and reimmerse (dunk) the infusion bag several times into the water and then squeeze the bag into the water for maximum coffee flavor. It has been found when this method is employed a coffee cup of high quality brewed coffee is obtained.

The following examples are presented to further illustrate this invention but is to be understood that the invention is not to be limited to the details described therein.

CONTROL A

In this Control Example 6 gms of roasted and ground coffee in an infusion bag were placed in a cup containing 5.3 ozs. of water having a temperature of 68° F. The roasted and ground coffee had an average particle size of about 480 mesh and the infusion bag had a porosity of about 426 cubic feet per minute of air per square feet at 0.5 inches of water. The cup was placed on a gas stove and heated by flame to a temperature of 180° F. in 2 minutes. After heating, the cup was removed from the heat and the coffee bag was dunked three times and then squeezed into the cup. It was determined that the coffee brew had soluble solids of 0.51 weight percent. It was determined that the final brew color was extremely light and the coffee had very thin flavor.

CONTROL B

This example is also presented as a Control. A coffee bag similar to that employed in Control A was placed in a cup container. Boiling water at a temperature of 212° F. was added to the cup containing the coffee bag. The temperature of the cup after 30 seconds was 180° F. The coffee bag was dunked three times at the start of brewing, three times after one minute and three times at the end of two minutes. At the end of two minutes the bag was removed and squeezed into the brew. The soluble solids of the brew was determined to be 0.63 weight percent. While the color of this coffee was acceptable, it was determined that the cup strength of the coffee was weak and lacking total coffee character.

EXAMPLE 1

In this Example a coffee bag similar to that employed in the above Controls was placed into 5.3 ozs. of cold water having a temperature of 68° F. The cold water with the immersed coffee bag was placed in a microwave heater and heated to a temperature of 180° F. in 90 seconds. Afterwards the coffee bag was dunked three times and the coffee bag squeezed into the brew. It was determined that the brew had a soluble solids content of 0.81 weight percent. It was further determined that the coffee brew resulted in a very dark color indicating a strong cup of coffee. An acceptable cup of coffee with flavor and strength resulted. Accordingly superior results were obtained over Controls A and B.

EXAMPLE 2

In this example three coffee bags similar to the coffee bag in Control A were prepared. Each coffee bag was immersed into preheated water, microwaved heated to 180° F., dunked three times and then squeezed into the cup. The first cup of water was preheated to 144° F. and then microwave heated for about 44 seconds. A cup of coffee with good flavor was produced. The second cup of water was preheated to 150° F. and then microwave heated for about 35 seconds. A cup of coffee with good flavor was prepared. The third cup of water was preheated to 155° F. and then microwave heated for about 28 seconds. A thin brew not acceptable as coffee was produced.

We claim:

1. A method for preparing a coffee brew which comprises:
    (a) immersing an infusion coffee bag containing roasted and ground coffee into a container of water, said water having a temperature of 50° F. to 150° F.; and
    (b) microwave heating said water containing the infusion coffee bag of roasted and ground coffee to a temperature of about 160° F. to 210° F. to produce a coffee brew.

2. The process according to claim 1 wherein the temperature of the water before microwave heating is from about 60° F. to about 150° F.

3. The process according to claim 1 wherein the water is in an amount of at least 4 oz.

4. The process according to claim 1 wherein the water is in an amount of at least 6 oz.

5. The process according to claim 1 wherein the infusion bag contains from about 5 gms to abut 15 gms of roasted and ground coffee.

6. The process according to claim 1 wherein the microwave heating operates at a frequency of 2,450 megahertz and a wavelength of 12.2 cm.

7. The process according to claim 1 wherein the microwave heating employs from about 400 watts to about 2,000 watts.

8. The process according to claim 1 wherein the microwave heating employs from about 600 watts to about 1,000 watts.

9. The process according to claim 1 further comprising removing the infusion coffee bag from and reimmersing it into the microwave heated water.

10. The process according to claim 1 further comprising squeezing the infusion coffee bag into the microwave heated water.

* * * * *